United States Patent [19]
Cornes et al.

[11] Patent Number: 6,047,061
[45] Date of Patent: Apr. 4, 2000

[54] ROUTING CALL PROCESSING COMMUNICATIONS IN A TELECOMMUNICATIONS SYSTEM

[75] Inventors: Martin P. J. Cornes; Keith W. Herndon; Christopher James Koath, all of Plano, Tex.

[73] Assignee: Alcatel USA Sourcing LP, Plano, Tex.

[21] Appl. No.: 08/996,957

[22] Filed: Dec. 23, 1997

[51] Int. Cl.[7] .............................. H04M 3/00; H04J 3/16
[52] U.S. Cl. ..................... 379/333; 379/229; 370/467; 370/420; 370/353
[58] Field of Search ............................. 370/401, 353, 370/420, 466, 467; 379/229, 230, 333

[56] References Cited

U.S. PATENT DOCUMENTS

| | | |
|---|---|---|
| 4,993,019 | 2/1991 | Cole et al. . |
| 5,088,089 | 2/1992 | Gingell et al. . |
| 5,105,421 | 4/1992 | Gingell . |
| 5,109,409 | 4/1992 | Bomgardner et al. . |
| 5,267,309 | 11/1993 | Sanders et al. . |
| 5,608,720 | 3/1997 | Biegel et al. ............................. 370/465 |
| 5,640,433 | 6/1997 | Szczebak, Jr. et al. ................. 375/377 |
| 5,822,420 | 10/1998 | Bolon et al. ............................ 379/230 |
| 5,859,895 | 1/1999 | Pomp et al. ............................ 379/399 |
| 5,917,815 | 6/1999 | Byers et al. ............................. 370/466 |

*Primary Examiner*—Paul Loomis
*Attorney, Agent, or Firm*—Fish & Richardson

[57] ABSTRACT

A telecommunications system includes an access terminal coupled to subscriber lines, a local exchange carrier (LEC) network, and a channel unit card coupling the access terminal to the LEC network. The channel unit card includes a processor configured to convert call processing signals received from the LEC network and formatted according to a protocol used by the LEC network to a message-oriented signal whose format is independent of the protocol used by the LEC network. The message-oriented signal then can be delivered to the access terminal. The channel unit card processor is further configured to convert message-oriented signals representing call processing communications received from the access terminal and having a format independent of a protocol recognized by the LEC network to one or more signals formatted according to the protocol recognized by the LEC network. The signals converted to the format recognized by the LEC network then can be routed to the LEC network.

33 Claims, 6 Drawing Sheets

ROUTING CALL PROCESSING COMMUNICATIONS IN A TELECOMMUNICATIONS SYSTEM

BACKGROUND

The present invention relates generally to routing call processing communications in a telecommunications system.

Telecommunications terminals connect subscriber lines, such as POTS (Plain Old Telephone Service) lines, ISDN (Integrated Services Digital Network) lines, E1 (Electronic Interface Level 1) lines, and optics lines, to telecommunications exchanges and other telecommunications equipment. An access terminal contains channel unit card slots that accept channel unit cards. The channel unit G cards, or line cards, convert analog or digital signals from subscriber lines into formatted digital data signals. Different types of channel unit cards service different types of subscriber lines.

An access terminal constructs a single time division multiplexed (TDM) signal from several channel unit cards' formatted digital data signals for transmission to remote telecommunications equipment. The terminal also demultiplexes TDM signals received from remote telecommunications equipment to deliver formatted digital data back to the channel unit cards. Channel unit cards convert the formatted digital data into a form suitable for transmission over subscriber lines.

Two telecommunications terminals can be connected "back to back" to form a digital carrier loop network. A digital carrier loop network typically includes a remote terminal placed near a business or residence and a central terminal placed in a central exchange connected to a telecommunications switch. The remote terminal and central terminal communicate over a single line carrying TDM signals. This configuration connects subscribers to the telecommunications switch.

Typically, the telecommunications switch and local exchange carrier network operate according to a protocol that is country-specific or vendor-specific. Such country-specific or vendor-specific protocols impose various signaling and other requirements that can affect multiple system components.

SUMMARY

In general, in one aspect, a telecommunications system includes an access terminal coupled to subscriber lines, a local exchange carrier (LEC) network, and a channel unit card coupling the access terminal to the LEC network. The channel unit card includes a processor configured to convert call processing signals received from the LEC network and formatted according to a protocol used by the LEC network to a message-oriented signal whose format is independent of the protocol used by the LEC network. The message-oriented signal then can be delivered to other components in the access terminal. The channel unit card processor is further configured to convert message-oriented signals, which represent call processing communications associated with the subscriber lines and which have a format independent of a protocol recognized by the LEC network, to one or more signals formatted according to the protocol recognized by the LEC network. The signals converted to the format recognized by the LEC network then can be routed to the LEC network.

In another aspect, a method of routing call processing communications includes receiving, in a channel unit card coupling an access terminal of a digital loop carrier to an LEC network, one or more call processing signals from the LEC network. The call processing signals, which are formatted according to a protocol used by the LEC network, are converted, in the channel unit card, to a message-oriented signal whose format is independent of the protocol used by the LEC network. The message-oriented signal is routed to other components in the access terminal.

In yet another aspect, a method of routing call processing communications includes receiving, in a channel unit card coupling an access terminal of a digital loop carrier to an LEC network, a message-oriented signal representing a call processing communication associated with a subscriber line. The message-oriented signal, which has a format independent of a signaling protocol recognized by the LEC network, is converted in the channel unit card to one or more signals formatted according to the protocol recognized by the LEC network. The converted signals are routed to the LEC network.

In various implementations, one or more of the following features may be present. Call processing signals received from the LEC network can include LEC network line activities of various types. Similarly, call processing communications associated with subscriber lines can include subscriber line activities of various types.

The message-oriented signals can have a format which includes an activity field whose contents identify a subscriber line or LEC network line activity. The format also can include one or more bytes of information identifying a message-oriented signal as conveying call processing information.

The LEC network formats call processing signals according to one of several protocols which can be, for example, either message-oriented or bit-oriented.

Various implementations may provide one or more of the following advantages. The number of changes which must be made to a telecommunications system when a new or different local exchange carrier network protocol is used can be reduced. Instead of system-wide changes to multiple system components, software changes to individual channel unit cards that serve as the interface between an access terminal and a local exchange carrier network can be made. Thus, a single access terminal can accommodate a wide range of local exchange carrier network protocols without the need to modify numerous components in the access terminal each time the local exchange carrier protocol is changed.

Additionally, in situations where the LEC network is capable of understanding and processing signals according to multiple protocols, a single access terminal can accommodate multiple channel unit cards that are coupled to the LEC network, even though different channel unit cards use different protocols when communicating with the LEC network.

The use of an access terminal which easily can be reconfigured each time a new local exchange carrier network protocol is used is particularly advantageous in the international market due to the variation in local exchange carrier network protocols used by different vendors in different geographic locations.

Additional features and advantages will be readily apparent from the following description, drawings and claims.

DETAILED DESCRIPTION

Figure 1:
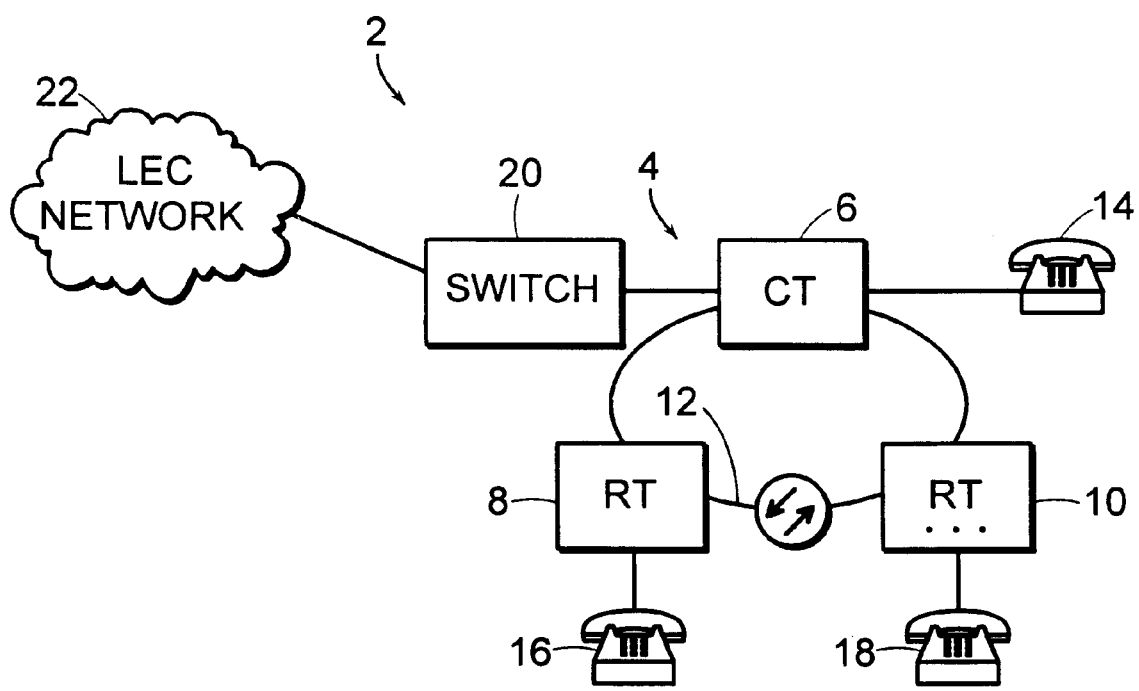
FIG. 1 is a block diagram of a telecommunications system.

As shown in FIG. 1, a telecommunications system 2 includes a digital loop carrier (DLC) 4. The digital loop carrier 4 includes a central office terminal (CT) 6 coupled to one or more remote terminals (RT) 8, 10 via metallic, fiber or other suitable communication media 12. The digital loop carrier 4 acts as a delivery unit for the system 2 and delivers call control and management signals. Subscriber devices, such as telephone service equipment 14, 16, 18, can be coupled to the central office terminal 6 and to the remote terminals 8, 10, respectively. The central office terminal 6 also is coupled to a local exchange carrier (LEC) network 22. The central office terminal 6 may be coupled to the LEC network 22 through a switch 20, such as a class 5switch. In different implementations, the switch 20 and LEC network 22 operate according to a protocol that uses either message-oriented signaling, such as the International Telecommunications Union Telecommunications standard set forth in the ITU-T Recommendation G.964, "V-Interfaces at the Digital Local Exchange (LE)—V5.1-Interface (Based on 2048 Kbit/s) for the Support of Access Network (AN)," or bit-oriented signaling, such as Channel Associated Signaling (CAS). Other message-oriented and bit-oriented protocols can also be used.

Figure 2:
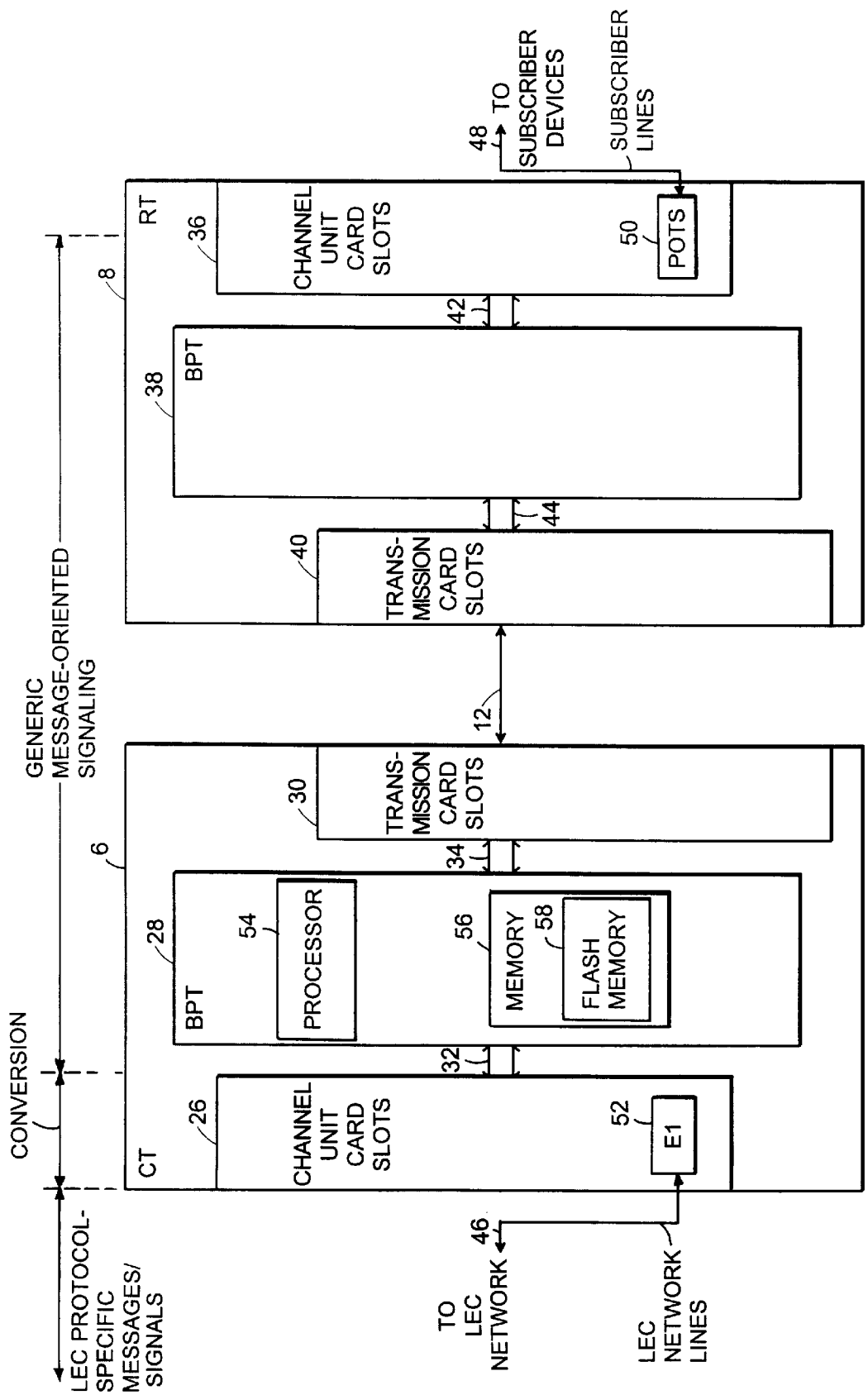
FIG. 2 is a block diagram of a digital loop carrier.

As shown in FIG. 2, the central office terminal 6 and the remote terminals, such as terminal 8, have one or more channel unit receptors, such as slots 26, 36, respectively, to accommodate channel unit cards which carry data signals to and from subscriber lines 48 and LEC network lines 46. The subscriber lines 48 are coupled to subscriber devices, such as the telephone 16. The LEC network lines 46 are coupled to the LEC network 22. Channel unit cards convert incoming subscriber line data signals into formatted digital data and convert formatted digital data into data signals suitable for transmission over the subscriber lines.

Different channel unit cards serve different kinds of narrowband (e.g., POTS, COIN, UVG/EWG, Four-Wire E&M, Universal Four-Wire, Basic Rate Interface Unit) and wideband (ISDN, DS1U, T1U, ADS1U, AT1U, E1, E1 Short Haul, E1 Long Haul and E1Conc) subscriber lines. As shown in FIG. 2, for example, a POTS card 50 is inserted in one of the channel unit card slots 36 at the remote terminal 8 for connection to a subscriber device. Similarly, an E1 card 52 is inserted into one of the channel unit card slots 26 at the central office terminal 6 for coupling signals to the LEC network 22. An E1 card is a 2-Megabit card that uses thirty-two channels in which each channel, or time slot, corresponds to a 64 kilobit per second (Kb/s), or DSO, signal. The slots 26, 36 also can accommodate additional channel unit cards of the same or different types.

As further shown in FIG. 2, each of the central office terminal 6 and the remote terminal 8 also includes one or more receptors or slots 30, 40 to accommodate transmission cards. Transmission cards enable the terminals 6, 8 to communicate over the communication media 12. The transmission cards handle the conversion between the communication medium 12 signals and electric signals that the terminals 6, 8 can understand and process.

Different transmission cards support different communication media. E1 cards, for example, can be used to support communications over metallic media, and optical line unit cards can be used for fiber optic communications. The E1 format can be used, for example, with TDM techniques based on the International Telecommunication Union CCITT's G.700 Series Recommendations.

The central office terminal 6 and the remote terminal 8 each includes at least one Bandwidth Allocator, Processor and Timing Unit (BPT) card 28, 38. Each BPT card 28, 38 collects formatted digital signals from its respective channel unit cards in the slots 26 or 36 and multiplexes them into a time domain multiplexed (TDM) signal. The multiplexed signal then can be sent over the transmission medium 12 via transmission cards in the slots 30 or 40, respectively. The BPT cards 28, 38 also receive TDM signals from their respective transmission cards. The BPT cards 28, 38 demultiplex the received TDM signals and route them for delivery to their respective channel unit cards in slots 26, 36. Respective subscriber bus interfaces 32, 42 are used to send signals between the channel unit cards in the slots 26 or 36 and their corresponding BPT cards 28 or 38. Similarly, octal buses 34, 44 are used to send signals between the transmission cards in the slots 30, 40 and their corresponding BPT cards 28 or 38.

In general, each BPT card, such as the BPT card 28, includes a processor 54, such as a microprocessor or a microcontroller, as well as various forms of associated memory 56. The memory 56 includes flash memory 58 such as electrically erasable programmable read only memory (EEPROM) as well as other types of memory, such as random access memory (RAM) and read only memory (ROM). The BPT card 38 is similar to the BPT card 28. Additional details of the BPT cards 28, 38 are described, for example, in a U.S. patent application, Ser. No. 08/920,183 entitled "Telecommunications Terminal" and filed on Nov. 14, 1997, which is assigned to the assignee of the present invention and which is incorporated herein by reference in its entirety.

Figure 3:
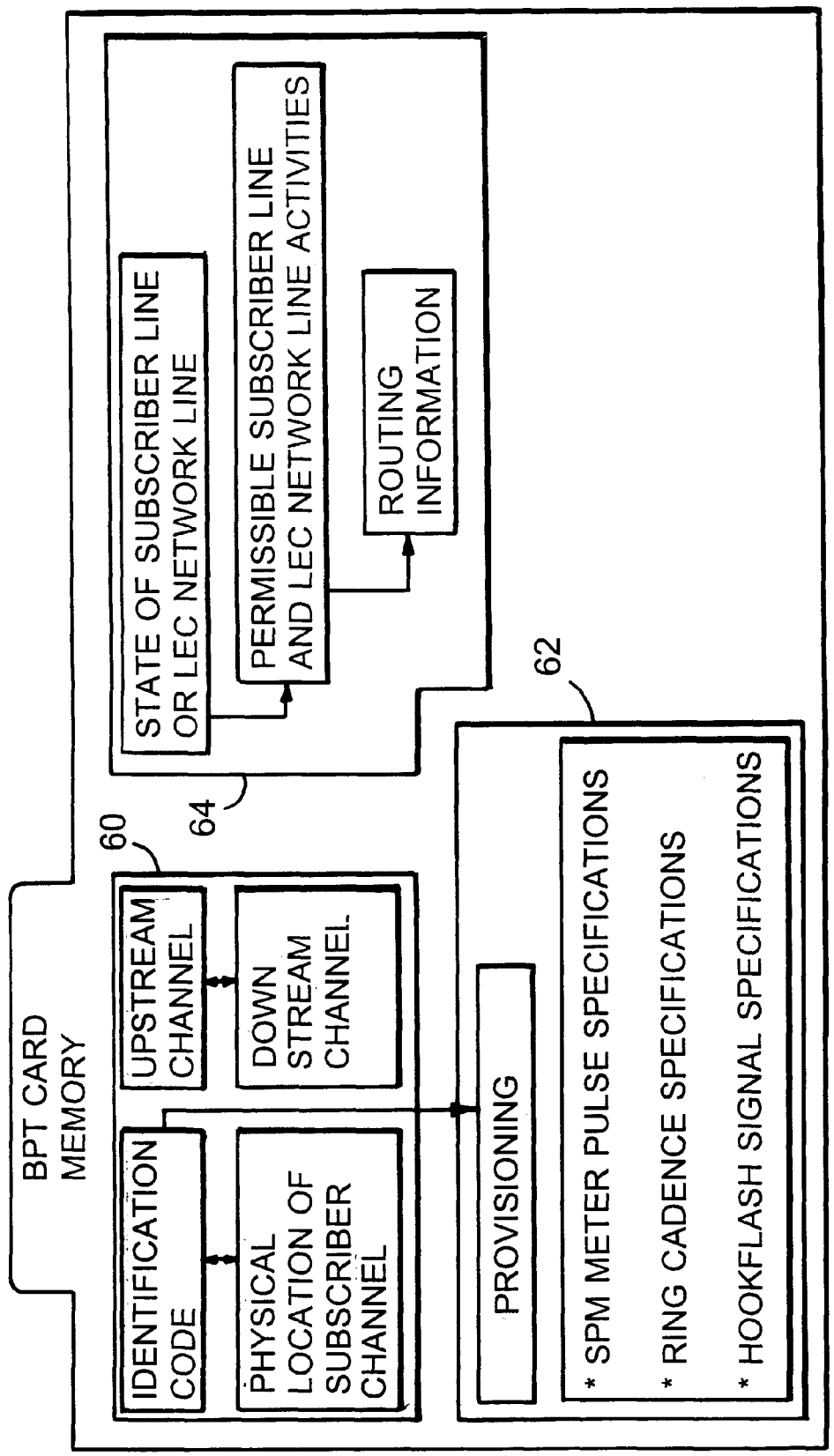
FIG. 3 shows various information stored in memory associated with a Bandwidth Allocator, Processor and Timing Unit (BPT) card.

As shown in FIG. 3, the flash memory 58 contains certain information which can be stored, for example, in the form of tables or databases. A first database 60 stores an identification code corresponding to the physical location of each channel or subscriber line on the channel unit cards, such as the POTS card 50 and the E1 card 52. The identification codes, each of which can be two bytes in length, are used for internal communications within and between the terminals 6, 8. The database 60 also stores a logical link or association between an upstream channel and a downstream channel, for example, a channel in the POTS card 50 and a channel in the E1 card 52. An administrator at a user interface terminal (not shown) can instruct the terminals 6, 8 to enter information in the database 60 using, for example, the Bellcore Transaction Language 1 (TL1).

A second database 62 stores information for provisioning a subscriber line or channel. The provisioning information includes, for example, the type of services that can be provided to a subscriber line. The information stored in the database 62 also can include the frequency of subscriber pulse metering, default ring cadence, durations of hook flash signals, among others. Such information also can be established by an administrator at a user interface terminal.

In general, a call processing communication can represent an activity that occurs on a particular subscriber line or LEC network line. The activities include various events that occur on the subscriber lines and LEC network lines during set-up, completion, interruption and termination of a telecommunications call. The range of possible activities represented by call processing communications can vary depending on the specific protocol used by the LEC network 22 as well as the type of subscriber devices coupled to the system 2. In any case, each type of call processing activity or event which can occur on a subscriber line or LEC network line is assigned a generic activity code. In one implementation, for example, the activity code is represented by a single byte of information. A particular activity code may represent a single signal or message according to the protocol used by one LEC network and may represent multiple signals or messages according to the protocol used by another LEC network.

The subscriber line activities include events which occur at the upstream end of the system and which are detected, for example, by the POTS card 50. Such subscriber line activities may need to be reported or delivered to other system components, such as the terminals 6, 8 and the LEC network 22. Subscriber line activities include, for example, detecting that an off-hook detector is active (SubsOffHook) or inactive (SubsOnHook), detecting a dialed pulse (DigitSignal), acknowledging completion of an initial ring (InitialRingAck), and detection of a hookflash condition (HookFlash).

The LEC network line activities include events which occur at the downstream end of the system and which may need to be reported to upstream system components, such as the POTS card 50. Such activities include, for example, the fact that a called party answered the call (SubsOffHook), that the party at the remote end terminated the call (Disconnect), the start and cadence of ringing (RingCadenced), notification to start subscriber pulse metering and notification of pulsed polarity (PulsedSignal), type of polarity (SteadySignal), and the start or completion of trunk conditioning (TrunkCondition).

Figure 4:
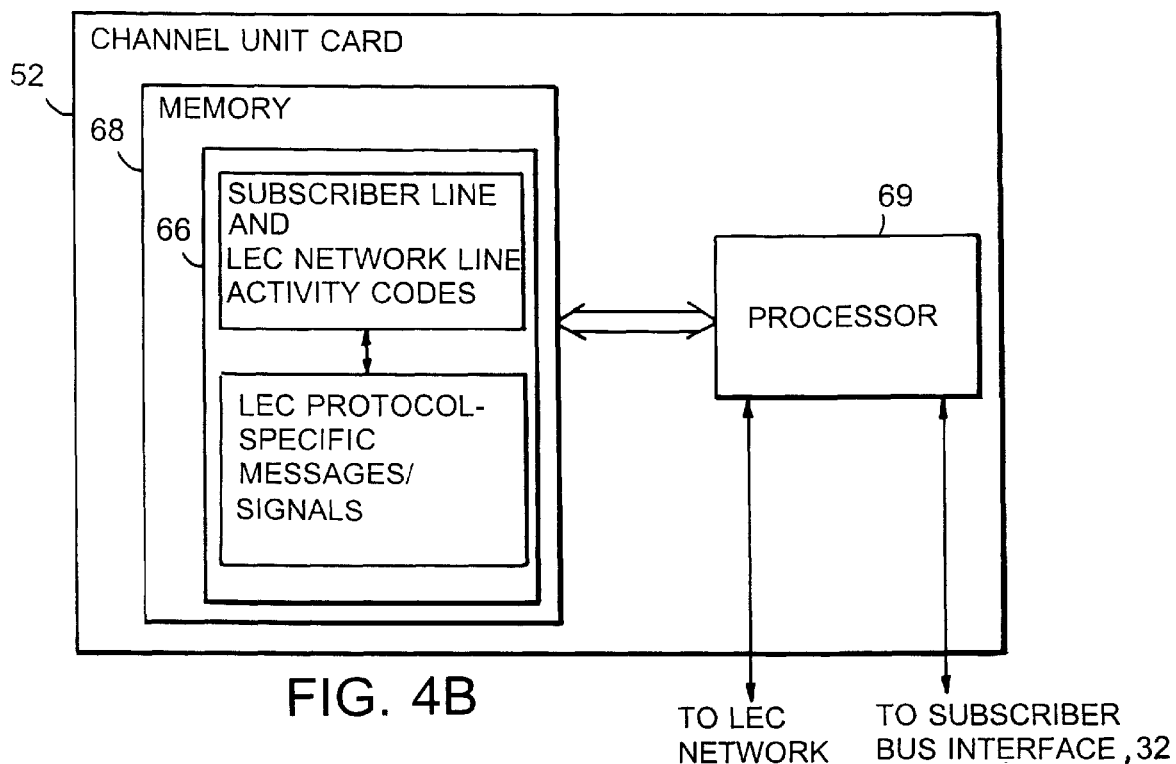
FIG. 4A is a partial list of subscriber line and LEC network line activities.
FIG. 4B is a block diagram of channel unit card.

FIG. 4A shows a partial list of possible subscriber line and LEC network line activities. Other activities also are possible.

Call processing communications between upstream channel unit cards, such as the POTS card 50, and the BPT card 38 in the remote terminal 8 use generic message-oriented signaling based on a format that is independent specific protocol that may be specified or required by the LEC network 22 and that incorporates an activity code representing a particular activity on a subscriber or LEC network line. Similarly, call processing communications between downstream channel unit cards, such as the E1 card 52, and the BPT card 28 in the central office terminal 6 use the generic message-oriented signaling. The generic message-oriented signaling is also used internally by the terminals 6, 8 and for call processing communications transmitted between the terminals 6, 8.

Figure 5:
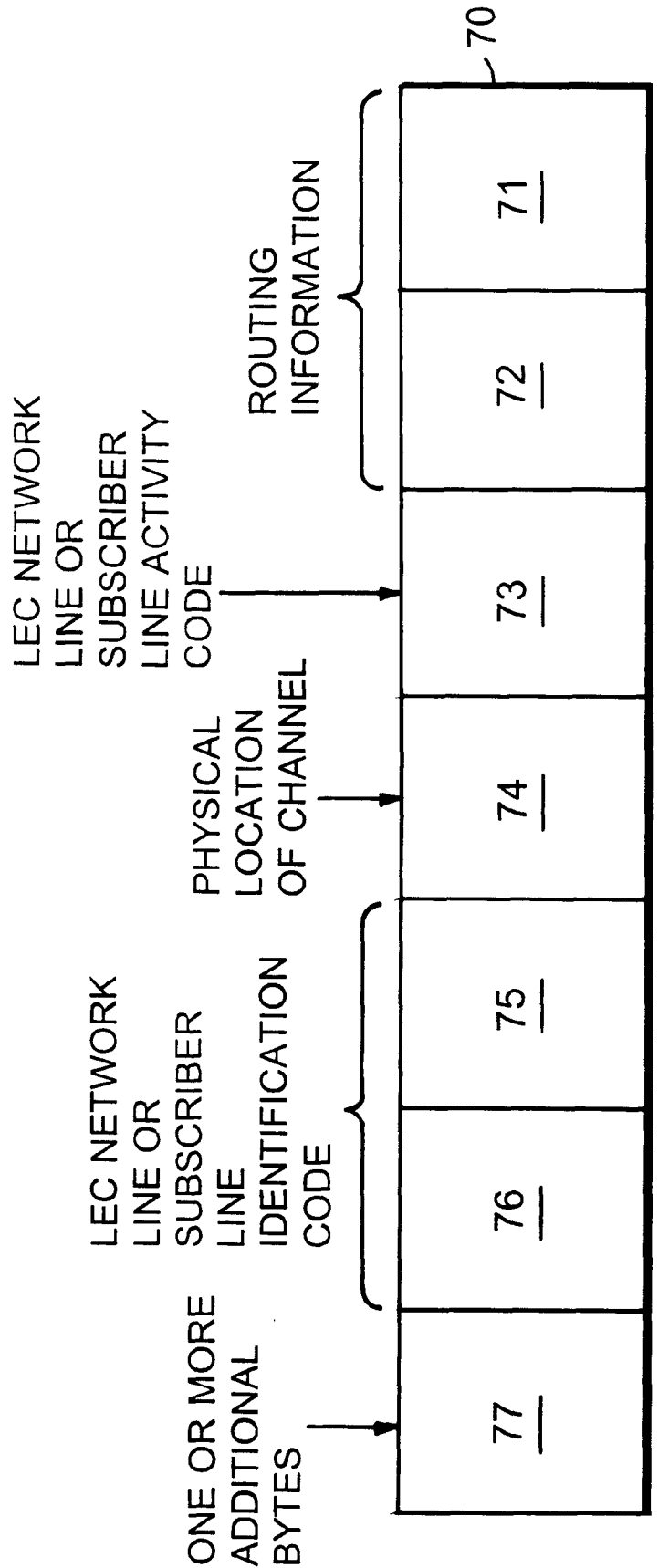
FIG. 5 shows a format of a generic call processing message.

When a particular subscriber line or LEC network line activity is to be reported or delivered to other system components using the generic message-oriented signaling, the appropriate activity code is incorporated into a message-oriented signal. In one implementation, as shown in FIG. 5, the format of a message-oriented signal 70 includes at least six bytes 71–76. Two bytes 71–72 contain information that identifies the type of signal 70. For example, the bytes 71–72 can identify the signal 70 as conveying call processing information. The information in the bytes 71–72 can be used, for example, to determine high level routing information. Another byte 73 serves as an activity field and contains the subscriber line or LEC network line activity code representing the particular subscriber line or LEC network line activity to be reported or delivered. An additional byte 74 identifies the physical location of the channel with which the activity is associated. Two bytes 75–76 can be used for the identification code corresponding to the subscriber line or LEC network line.

Certain activities may require the addition of one or more bytes 77 to the generic message-oriented signal 70. For example, an additional byte to identify the value of a dialed digit is added to a message 70 incorporating a DigitSignal activity code. Similarly, additional bytes to indicate ringing requirements are added to a message 70 incorporating a RingCadenced activity code. The information contained in the bytes 77 can be used to access and retrieve further information, such as the information stored in the database 62 (FIG. 3).

As previously noted, the protocol required by a particular LEC network, such as the network 22, or other downstream telecommunications equipment can be one of several message-oriented or bit-oriented protocols. Thus, prior to connection to the access terminal 6, each downstream channel unit card, such as the E1 card 52, is programmed to perform the conversion between generic message-oriented signals used by the terminals 6, 8 and the messages or signals associated with the specific protocol used and recognized by the LEC network 22. Once a channel unit card, such as the E1 card 52, is installed in the terminal 6, the BPT card 26 can provide the card 52 with required information, including, for example, the identification code corresponding to the physical location of a subscriber channel.

Each downstream channel unit card, such as the E1 card 52, includes a database or table 66 (FIG. 4B) stored, for example, in flash memory 68. The table 66 establishes a relationship between activity codes and the corresponding protocol-specific messages or signals recognized and used by the switch 20 and LEC network 22. Thus, activity codes and their corresponding protocol-specific messages associated with subscriber line and LEC network line activities, such as those listed in FIG. 4A, are stored in the memory 68.

Each channel unit card, such as the E1 card 52, also includes a processor 69 which is configured to convert call processing communications received from upstream channel units to protocol-specific messages or signals based on the particular protocol required by the LEC network 22. Similarly, the processor 69 is configured to convert protocol-specific call processing messages or signals received from the LEC network 22 to the generic message-oriented signaling recognized and used by the terminals 6, 8. The processor 69 can be implemented, for example, using a microprocessor or microcontroller.

A subscriber line or LEC network line can be in one of several call control states. For example, possible states include an idle state and an active state, indicating that a particular line is idle or active, respectively. Each BPT card 28, 38 includes a third table or database 64 (FIG. 3) which stores permissible activities for each state. The table 64 indicates where a generic message-oriented signal incorporating an activity code is to be routed. Various generic message-oriented signals are routed to other software tasks in the BPT processor, to an upstream channel unit card, such as the POTS card 50, or a downstream channel unit card, such as the E1 card 52. The routing of a generic message-oriented signal depends on the state of the subscriber or LEC network line at the time the message-oriented signal is received, as well as the activity identified in the message-oriented signal. The routing of the message-oriented signal also depends on where the call processing signal originated. The information contained in the third table 64 can be incorporated as part of the software code of the processor 54 or otherwise stored in the memory 56.

Figure 6:
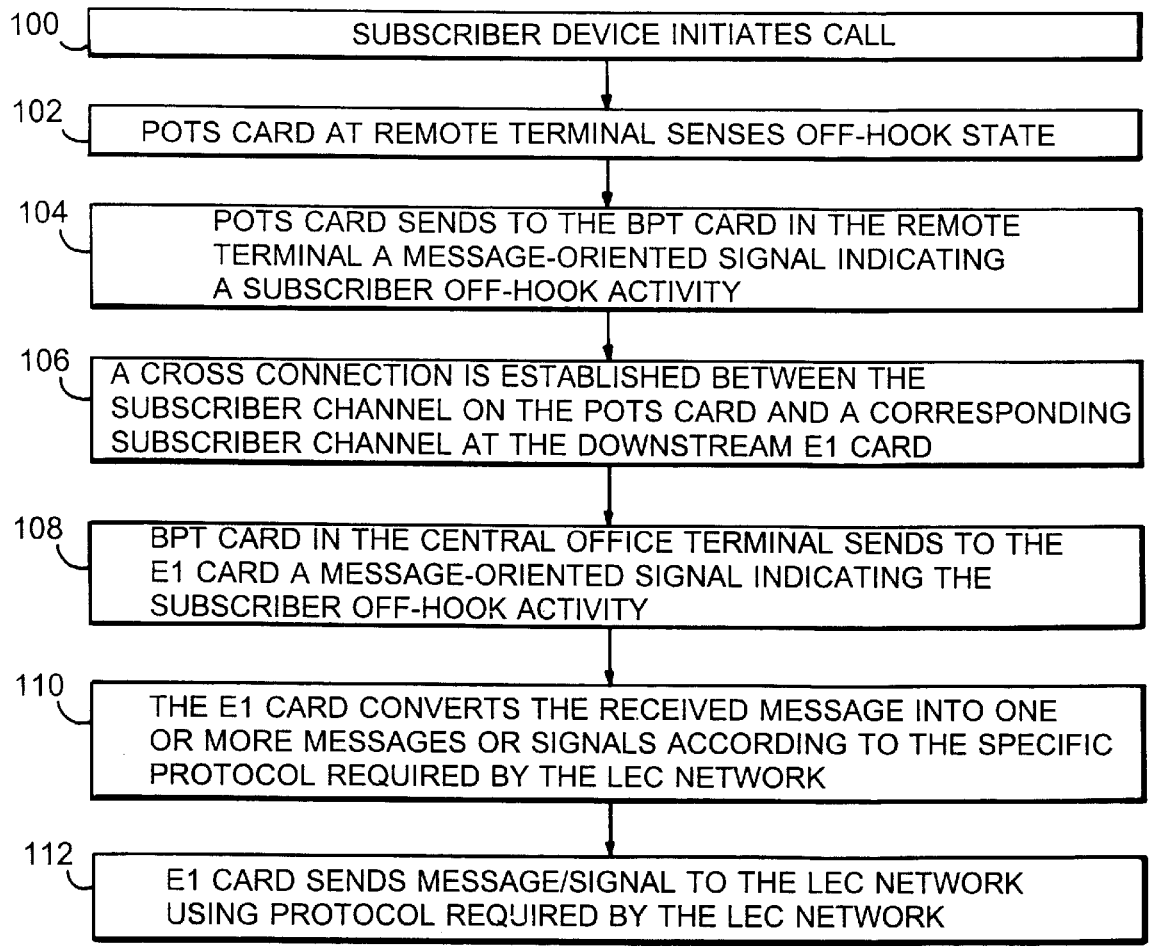
FIG. 6 illustrates the flow of exemplary call processing messages through the telecommunications system.

FIG. 6 illustrates exemplary call processing messages which are delivered during the establishment of an outgoing call from a subscriber device, such as the device 16, to the LEC network 22. For purposes of illustration, it is assumed that the subscriber device 16 is coupled to the POTS card 50 and is associated with a channel on the E1 card 52. It is also assumed that the switch 20 and LEC network 22 use a specified protocol. It is further assumed that prior to its insertion into an appropriate one of the channel unit slots 26, the E1 card 52 is programmed to understand and process signals using the specified LEC network protocol.

As indicated by step 100, to initiate a call, the subscriber device 16 seizes an associated subscriber line once it is placed in an off-hook state. The POTS card 50 senses the off-hook state, as indicated by step 102. Next, as shown by step 104, the POTS card 50 sends to the BPT card 38 a message-oriented signal 70 with the SubsOffHook activity code in byte 73. A cross connection is established between the subscriber channel on the POTS card 50 and the corresponding subscriber channel at the E1 card 52, as indicated by step 106. The cross-connection can be established according to any one of several techniques, including techniques disclosed in a U.S. patent application [attorney docket 08242.014001 ] Ser. No. 08/996,686 entitled "Routing Telecommunications Traffic", filed concurrently with the present application. The disclosure of that application is incorporated herein by reference in its entirety.

Once the appropriate cross connection is established, the BPT card 28 in the central office terminal 6 sends to the E1 card 52 the message-oriented signal 70 with the SubsOff-Hook activity code in byte 73, as shown by step 108. Next, as indicated by step 110, the E1 card 52 converts the received message-oriented signal 70 into appropriate messages or signals according to the protocol required by the LEC network 22. For example, if the LEC network 22 uses the international V5.1 protocol, then the E1 card 52 would generate an Establish message and send the Establish message to the LEC network 22, as indicated by step 112. On the other hand, if the LEC network 22 uses CAS signaling, then the E1 card 52 would convert the message-oriented signal 70 to the appropriate CAS signals and send the converted message to the LEC network 22.

Other call processing communications are handled in a similar fashion. In general, a channel unit card coupling the access terminal to the LEC network converts generic message-oriented signals representing subscriber line activities to one or more signals formatted according to a specific protocol recognized by the LEC network. The protocol-specific signals then can be routed to the LEC network. Similarly, the channel unit card coupling the access terminal to the LEC network converts call processing signals representing LEC network line activities to a message-oriented signaling format that is independent of the LEC network protocol prior to delivering the activity information to other components in the system.

Although the foregoing implementations have been described with respect to an E1 card 52, other types of digital or analog channel unit cards can also be used to couple the terminal 6 to the LEC network 22. Whatever card type is used, prior to insertion of the card into the appropriate channel unit slot 26, the card is programmed to perform the conversions between LEC network call processing communications and the generic message-oriented signaling used by the terminals 6, 8.

Additionally, although the foregoing techniques have been described with respect to a digital loop carrier system having a central office terminal and a remote terminal, the techniques can be used in a stand-alone access terminal as well.

In addition, in some implementations a single LEC network 22 may include various components which allow the LEC network to handle signals or messages using more than one protocol. In that case, a single access terminal can accommodate multiple channel unit cards that are coupled to the LEC network, even though different channel unit cards use different protocols when communicating with the LEC network.

Other implementations are within the scope of the following claims.

What is claimed is:

1. A method of routing call processing communications in a telecommunications system, the method comprising:

receiving, in a channel unit card coupling an access terminal of a digital loop carrier to a local exchange carrier (LEC) network, one or more call processing signals from the LEC network, wherein the call processing signals are formatted according to a protocol used by the LEC network;

converting, in the channel unit card, the received call processing signals to a message-oriented signal whose format is independent of the protocol used by the LEC network; and routing the message-oriented signal to other components in the access terminal.

2. The method of claim 1 wherein the call processing signals correspond to an activity on an LEC network line.

3. The method of claim 2 wherein the message-oriented signal has a format comprising an activity field whose contents identify the LEC network line activity.

4. The method of claim 3 wherein the format further comprises one or bytes of information identifying the message-oriented signal as conveying call processing information.

5. The method of claim 2 further comprising delivering LEC network line activity information contained in the message-oriented signal to a far end channel unit card coupled to a subscriber device, wherein the LEC network line activity information is delivered using a message-oriented signal whose format is independent of the protocol used by the LEC network.

6. The method of claim 2 further comprising delivering LEC network line activity information contained in the message-oriented signal to another access terminal in the digital loop carrier, wherein the LEC network line activity information is delivered using a message-oriented signal whose format is independent of the protocol used by the LEC network.

7. The method of claim 2 wherein the protocol used by the LEC network employs message-oriented signaling.

8. The method of claim 2 wherein the protocol used by the LEC network employs bit-oriented signaling.

9. The method of claim 2 wherein the call processing signals comprise signals indicating that a called party answered a call.

10. The method of claim 2 wherein the call processing signals comprise signals indicating that a call has been disconnected.

11. The method of claim 2 wherein the call processing signals comprise signals relating to ring cadencing.

12. The method of claim 2 wherein the call processing signals comprise signals relating to subscriber pulse metering.

13. The method of claim 2 wherein the call processing signals comprise signals relating to trunk conditioning.

14. The method of claim 2 wherein the call processing signals comprise signals relating to signal polarity.

15. A method of routing call processing communications in a telecommunications system, the method comprising:

receiving, in a channel unit card coupling an access terminal of a digital loop carrier to a local exchange carrier (LEC) network, a message-oriented signal representing a call processing communication associated with a subscriber line, wherein the message-oriented signal has a format independent of a signaling protocol recognized by the LEC network;

converting, in the channel unit card, the received message-oriented signal to one or more signals formatted according to the protocol recognized by the LEC network; and routing the converted signals to the LEC network.

16. The method of claim 15 wherein the call processing communication corresponds to an activity on the subscriber line.

17. The method of claim 16 wherein the message-oriented signal has a format comprising an activity field whose contents identify the subscriber line activity.

18. The method of claim 17 wherein the format further comprises one or bytes of information identifying the message-oriented signal as conveying call processing information.

19. The method of claim 16 further comprising delivering subscriber line activity information contained in the message-oriented signal to the access terminal, wherein the subscriber line activity information is delivered using a message-oriented signal whose format is independent of the protocol recognized by the LEC network.

20. The method of claim 16 wherein the protocol recognized by the LEC network uses message-oriented signaling.

21. The method of claim 16 wherein the protocol recognized by the LEC network uses bit-oriented signaling.

22. The method of claim 16 wherein the message-oriented signal indicates whether an off-hook detector associated with the subscriber line is active or inactive.

23. The method of claim 16 wherein the message-oriented signal indicates completion of an initial ring.

24. The method of claim 16 wherein the message-oriented signal indicates a value of a dialed digit.

25. The method of claim 16 wherein the message-oriented signal indicates detection of a hookflash condition.

26. A telecommunications system comprising:

an access terminal coupled to subscriber lines;

a local exchange carrier (LEC) network; and a channel unit card coupling the access terminal to the LEC network, wherein the channel unit card comprises a processor configured to convert call processing signals received from the LEC network and formatted according to a protocol used by the LEC network to a message-oriented signal whose format is independent of the protocol used by the LEC network and to route the message-oriented signal to other components in the access terminal, and wherein the processor is configured further to convert message-oriented signals, which represent call processing communications associated with the subscriber lines and which have a format independent of a protocol recognized by the LEC network, to one or more signals formatted according to the protocol recognized by the LEC network and to route, to the LEC network, the signals converted to the format recognized by the LEC network.

27. The system of claim 26 wherein the call processing signals received from the LEC network comprise LEC network line activities.

28. The system of claim 26 wherein the call processing communications associated with the subscriber lines comprise subscriber line activities.

29. The system of claim 26 wherein the message-oriented signals have a format comprising an activity field whose contents identify a subscriber line or LEC network line activity.

30. The system of claim 29 wherein the format further comprises one or more bytes of information identifying the message-oriented signals as conveying call processing information.

31. The system of claim 26 wherein the LEC network formats call processing signals according to a message-oriented protocol.

32. The system of claim 26 wherein the LEC network formats call processing signals according to a bit-oriented protocol.

33. A telecommunications system comprising:

an access terminal coupled to subscriber lines;

a local exchange carrier (LEC) network; and first and second channel unit cards coupling the access terminal to the LEC network, wherein the first channel unit card comprises a first processor configured to convert call processing signals received from the LEC network and formatted according to a first protocol used by the LEC network to message-oriented signals whose format is independent of the first protocol used by the LEC network and to route the message-oriented signals to other components in the access terminal, and wherein the second channel unit card comprises a second processor configured to convert call processing signals received from the LEC network and formatted according to a second protocol used by the LEC network to message-oriented signals whose format is independent of the second protocol used by the LEC network and to route the message-oriented signals to other components in the access terminal.

* * * * *